United States Patent
Xu et al.

(10) Patent No.: US 12,113,187 B2
(45) Date of Patent: Oct. 8, 2024

(54) METHOD FOR RECOVERING VALUABLE METALS FROM SPENT LITHIUM ION BATTERIES

(71) Applicants: GEM CO., LTD., Shenzhen (CN); JINGMEN GEM CO., LTD., Jingmen (CN)

(72) Inventors: Kaihua Xu, Shenzhen (CN); Liangxing Jiang, Jingmen (CN); Jian Yang, Jingmen (CN); Kun Zhang, Shenzhen (CN); Chenwei Li, Shenzhen (CN); Yongan Chen, Jingmen (CN); Yanqing Lai, Jingmen (CN)

(73) Assignees: GEM CO., LTD., Shenzhen (CN); JINGMEN GEM CO., LTD., Jingmen (CN)

( * ) Notice: Subject to any disclaimer, the term of this patent is extended or adjusted under 35 U.S.C. 154(b) by 0 days.

(21) Appl. No.: 18/498,037

(22) Filed: Oct. 31, 2023

(65) Prior Publication Data
US 2024/0063455 A1 Feb. 22, 2024

Related U.S. Application Data

(63) Continuation of application No. PCT/CN2022/110995, filed on Aug. 9, 2022.

(30) Foreign Application Priority Data

Sep. 1, 2021 (CN) .......................... 202111020944.1

(51) Int. Cl.
*H01M 10/54* (2006.01)
*C01F 11/22* (2006.01)
(Continued)

(52) U.S. Cl.
CPC ............. *H01M 10/54* (2013.01); *C01F 11/22* (2013.01); *C22B 1/02* (2013.01); *C22B 1/248* (2013.01);
(Continued)

(58) Field of Classification Search
CPC .......... H01M 10/54; C01F 11/22; C22B 1/02; C22B 1/248; C22B 3/22; C22B 7/001; C22B 7/007; C22B 7/008
See application file for complete search history.

(56) References Cited

U.S. PATENT DOCUMENTS

2002/0009645 A1* 1/2002 Shima ................... H01M 4/505
429/231.1
2011/0111294 A1* 5/2011 Lopez ................... H01M 4/525
977/773

FOREIGN PATENT DOCUMENTS

CN 103449400 A * 12/2013
CN 106921000 A * 7/2017
(Continued)

*Primary Examiner* — Keith D. Hendricks
*Assistant Examiner* — Moriah S. Smoot

(57) ABSTRACT

The present invention provides a method for recovering valuable metals from waste lithium ion batteries. The method comprises: short-circuit discharging, dismantling, crushing, roasting, and screening on waste lithium ion batteries to obtain active electrode powders; using alkaline solution to wash the active electrode powders, then filtering to remove copper and aluminum; drying the activated electrode powder after alkaline washing treatment, mix the dried activated electrode powder with starch and concentrated sulfuric acid and stir evenly to obtain the mixed material; calcining the mixed material with controlling the atmosphere; taking out the product obtained from calcination and using deionized water to extract the leachate and leaching residue with valence metal ions, and then obtaining the leachate after filtering. The present invention can reduce the (Continued)

concentration of impurity ions in the leaching solution, improve the purity and comprehensive recovery rate of valuable metals, and reduce the recovery cost.

8 Claims, 1 Drawing Sheet

(51) Int. Cl.
    *C22B 1/02*     (2006.01)
    *C22B 1/248*     (2006.01)
    *C22B 3/22*     (2006.01)
    *C22B 7/00*     (2006.01)

(52) U.S. Cl.
    CPC ............... *C22B 3/22* (2013.01); *C22B 7/001* (2013.01); *C22B 7/007* (2013.01); *C22B 7/008* (2013.01)

(56) References Cited

FOREIGN PATENT DOCUMENTS

| | | | | |
|---|---|---|---|---|
| CN | 108649291 A | * | 10/2018 | |
| CN | 109088115 A | * | 12/2018 | ........ H01M 10/0525 |
| CN | 111129632 A | * | 5/2020 | ............ C01D 15/08 |
| CN | 111254294 A | * | 6/2020 | ............ C01D 15/08 |
| CN | 111321297 A | * | 6/2020 | ............ C22B 26/12 |
| CN | 111392750 A | | 7/2020 | |

\* cited by examiner

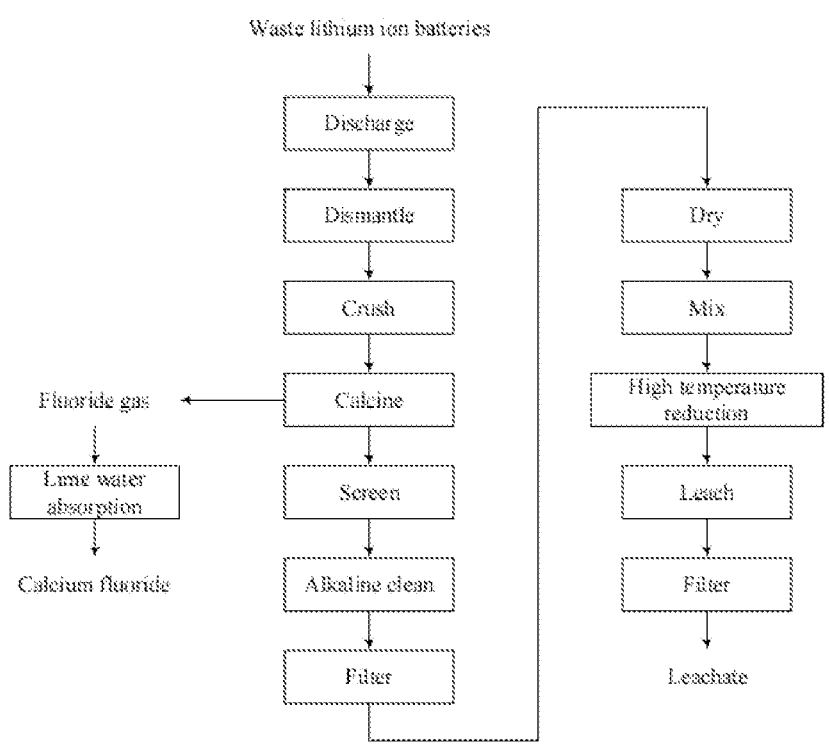

METHOD FOR RECOVERING VALUABLE METALS FROM SPENT LITHIUM ION BATTERIES

FIELD OF THE DISCLOSURE

The disclosure relates to the technical field of recycling waste lithium ion batteries, in particular to a method for recovering valuable metals from waste lithium ion batteries.

BACKGROUND

With the rapid development of modern science and technology, the problem of social energy and environmental ecological pollution has become increasingly prominent, especially the environmental and ecological pollution of various waste batteries has become the focus of social attention. Lithium ion batteries are widely used in the field of power batteries and energy storage batteries due to their high capacity, stable cycle performance, and high working platform voltage. However, in terms of the demand for battery materials, power and energy storage batteries generally are usually larger than conventional small batteries. Therefore, in the next 3-5 years, a large number of lithium ion batteries will be scrapped, and their recycling has high social value.

At present, in the recycling technology of waste lithium ion batteries at home and abroad, the main way to deal with the electrode active materials of waste lithium ion batteries is as follows: 1) Acid reduction leaching to obtain a plasma leachate containing $Li^+$, $Ni^{2+}$, $Co^{2+}$, $Mn^{2+}$, $Al^{3+}$, and $Fe^{3+}$, depositing to remove iron and aluminum, and then adjusting the pH value to obtain a single metal deposition. 2) Depositing to remove iron and aluminum, extracting nickel, cobalt, manganese, and then acid stripping to obtain a salt solution with only nickel, cobalt or manganese. There are still certain defects in the existing recycling technology of waste lithium ion batteries, such as "a method for recovering valuable metals in $LiMn_{1-x-y}Ni_xCo_yO_2$ batteries and preparing $LiMn_{1-x-y}Ni_xCo_yO_2$ batteries" published by Chinese patent CN104538695A. This patent utilizes acid leaching to recover valuable metals from waste nickel cobalt lithium manganese batteries. Firstly, the electrode active material is leached with inorganic acid to obtain a leachate, which deposits iron and aluminum. Then alkali is added to control different pH values to obtain the deposit for a single metal. Finally, lithium is recovered. This method achieves the recovery of waste ternary lithium ion batteries, but there are problems with low product purity and secondary pollution caused by the production of non-degradable inorganic acid wastewater during acid leaching. Another example is "a process for recovering valuable metals from waste lithium batteries" published by Chinese patent CN102162034A. In this patent, valuable metals such as cobalt, copper, nickel, and aluminum are recovered by a series of processes such as pre-treatment, leaching, chemical removal of impurities, and extraction. However, expensive extractants need to be used in the extraction process, and the operation is complex. Although this process is close to the recycling process used in industrial production, it still has the disadvantage of high recycling costs. The above processes all involve acid leaching followed by impurity removal to recover metals such as nickel, cobalt, and manganese, and finally to recover lithium. They only deal with a single type of waste lithium ion battery.

SUMMARY

The present invention discloses a method for recovering valuable metals from waste lithium ion batteries. This method can reduce the concentration of impurity ions in the leachate, improve the purity and comprehensive recovery rate of valuable metals, and reduce the recovery cost.

The contents of the present invention are as follows:

The present invention provides a method for recovering valuable metals from waste lithium ion batteries. The method includes the following steps:

Step 1: Pre-Treatment

Short-circuit discharging, dismantling, crushing, roasting, and screening on waste lithium ion batteries to obtain active electrode powders; the waste lithium ion battery is one or more of the waste lithium nickel oxide lithium ion battery, lithium cobalt oxide lithium ion battery, lithium manganese oxide lithium ion battery, and lithium nickel cobalt manganese oxide lithium ion battery;

Step 2: Alkaline Cleaning and Filtering

Using alkaline solution to wash the active electrode powders, then filtering to remove copper and aluminum;

Step 3: Drying and Mixing

Drying the activated electrode powder after alkaline washing treatment, mix the dried activated electrode powder with starch and concentrated sulfuric acid in a predetermined proportion and stir evenly to obtain the mixed material;

Step 4: High Temperature Reduction

Putting the mixed material into a corundum crucible, and then moving the corundum crucible into a tube furnace to calcine with controlling the atmosphere;

Step 5: Water Leaching and Filtration

Taking out the product obtained from calcination in the step 4 and using deionized water to extract the leachate and leaching residue with valence metal ions, and then obtaining the leachate after filtering.

Furtherly, the specific step 1 is as follows: the waste lithium ion batteries are short-circuit discharging the waste lithium ion batteries in a sodium sulfite solution until the termination voltage is below 1 V, wherein the solute concentration of the sodium sulfite solution is 5-20%; disassembling the waste lithium ion batteries after short-circuit discharging to obtain battery cells; crushing the battery cells to obtain crushed materials; raising the temperature of the crushed materials to 400-600° C. at a rate of 2-10° C./min in an air atmosphere, maintaining insulation and calcining to strip the adhesive; lime water with a concentration of not less than 50 mg/L is used to absorb the waste gas released during the adhesive stripping process to obtain calcium fluoride; separating the stripped product to obtain Al foil, Cu foil, and active electrode powders.

Furtherly, in the step 2, the alkaline solution is one or more of NaOH, NH4OH and KOH, with a pH value of 10-14, an alkaline cleaning time of 10-60 min, and a temperature of 20-50° C.

Preferably, in the step 2, the pH value of the alkaline solution is 10-12, the alkaline cleaning time is controlled within 10-30 min, and the temperature is controlled between 25-35° C.

Furtherly, in the mixing process of the step 3, the dried active electrode powders are mixed with starch, and then concentrated sulfuric acid is added at a solid-liquid ratio of 50-300 g/L and stirred evenly; wherein the amount of starch added is controlled at 5-20 wt. %.

Preferably, in the step 3, the amount of starch is controlled at 5-10 wt. %, the solid-liquid ratio is controlled between 100-150 g/L.

Furtherly, in the step 4, controlling the calcination temperature at 300-800° C., heating rate at 10° C./min, and calcination time at 30-180 min; wherein the atmosphere is a mixture of $O_2$ and $N_2$, and the volume fraction of $O_2$ is controlled between 0-50%.

Preferably, in the step 4, controlling the calcination temperature at 500-800° C., calcination time at 60-120 min, and the volume fraction of $O_2$ between 10-20%.

Furtherly, in the deionized water leaching process of the step 5, the solid-liquid ratio is controlled between 50-100 g/L, the temperature is between 50-90° C., and the leaching time is between 30-180 min.

Preferably, in the deionized water leaching process of the step 5, the solid-liquid ratio is controlled between 50-80 g/L, the temperature is between 60-80° C., and the leaching time is between 60-90 min.

The advantages of the present invention are as follows:
(1) In the present invention, the active electrode powders are subjected to alkaline cleaning pre-treatment, and then recovered through a combination of high temperature reduction and water leaching after removing copper and aluminum. This method breaks the traditional method of recycling valuable metals from waste lithium ion batteries. On the one hand, the present invention pre cleans the active electrode powders with alkali, greatly reducing the concentration of impurity ions in the leachate, solving the problem of low product purity in existing waste lithium ion battery recovery technology, avoiding the loss of valuable metals during the traditional recovery process, and effectively improving the comprehensive recovery rate of valuable metals. On the other hand, the present invention adopts a comprehensive method of high temperature reduction and deposition for the recovery of valuable metals, solving the problems of low product quality, small processing scale, and complex process recovery by using a single deposition method. It avoids the use of expensive extractants for the separate recovery of valuable metals such as Cu, Ni, Co, and significantly reduces the recovery cost.
(2) The present invention can simultaneously process multiple types of waste lithium ion batteries without separate recycling, and is suitable for forming a closed circuit process without generating secondary pollution. This method combines environmental protection and economic benefits, with a wide range of variable operating conditions, simple operation, and good repeatability. Unlike most existing methods that are only applicable to laboratories, the present invention is particularly suitable for industrial large-scale production.

BRIEF DESCRIPTION OF THE DRAWINGS

Accompanying drawings are for providing further understanding of embodiments of the disclosure. The drawings form a part of the disclosure and illustrate the principle of the embodiments of the disclosure along with the literal description. The drawings in the description below are merely some embodiments of the disclosure; a person skilled in the art can obtain other drawings according to these drawings without creative efforts. In the FIGURES:

FIG. 1 is a process diagram of the method for recovering valuable metals from waste lithium ion batteries.

DETAILED DESCRIPTION OF PREFERRED EMBODIMENTS

The present invention will be further described in conjunction with the accompanying drawings and specific examples.

As shown in FIG. 1, the method for recovering valuable metals from waste lithium ion batteries of the present invention includes the following steps:

Step 1: Pre-Treatment

Short-circuit discharging, dismantling, crushing, roasting, and screening on waste lithium ion batteries to obtain active electrode powders.

In the present invention, short-circuit discharging of waste lithium ion batteries, dismantling of discharged waste lithium ion batteries, crushing of the battery cells obtained after dismantling, stripping of adhesives, and separation to obtain active electrode powders. The above operations can all use well-known operations in this field. Preferably, the waste lithium ion batteries are short-circuit discharging the waste lithium ion batteries in a sodium sulfite solution until the termination voltage is below 1 V, wherein the solute concentration of the sodium sulfite solution is 5-20%; disassembling the waste lithium ion batteries after short-circuit discharging to obtain battery cells; crushing the battery cells to obtain crushed materials; raising the temperature of the crushed materials to 400-600° C. at a rate of 2-10° C./min in an air atmosphere, maintaining insulation and calcining to strip the adhesive; lime water with a concentration of not less than 50 mg/L is used to absorb the waste gas released during the adhesive stripping process to obtain calcium fluoride; separating the stripped product to obtain Al foil, Cu foil, and active electrode powders.

The waste lithium ion battery is one or more of the waste lithium nickel oxide lithium ion battery, lithium cobalt oxide lithium ion battery, lithium manganese oxide lithium ion battery, and lithium nickel cobalt manganese oxide lithium ion battery. The present invention can simultaneously process multiple types of waste lithium ion batteries without separate recycling, and is suitable for forming a closed circuit process without generating secondary pollution. This method combines environmental protection and economic benefits, with a wide range of variable operating conditions, simple operation, and good repeatability. Unlike most existing methods that are only applicable to laboratories, the present invention is particularly suitable for industrial large-scale production.

Step 2: Alkaline Cleaning and Filtering

Using alkaline solution to wash the active electrode powders, then filtering to remove copper and aluminum.

The alkaline solution is one or more of NaOH, $NH_4OH$ and KOH, with a pH value of 10-14, an alkaline cleaning time of 10-60 min, and a temperature of 20-50° C. Preferably, the pH value of the alkaline solution is 10-12, the alkaline cleaning time is controlled within 10-30 min, and the temperature is controlled between 25-35° C.

The present invention pre cleans the active electrode powders with alkali, greatly reducing the concentration of impurity ions in the leachate. It can obtain a leachate with low impurity ion concentration and rich in valuable metal ions such as lithium, nickel, cobalt, and manganese. Further, it can solve the problem of low product purity in existing waste lithium ion battery recovery technology, avoid the loss of valuable metals during the traditional recovery process, and effectively improve the comprehensive recovery rate of valuable metals.

Step 3: Drying and Mixing

Drying the activated electrode powder after alkaline washing treatment, mix the dried activated electrode powder with starch and concentrated sulfuric acid in a predetermined proportion and stir evenly to obtain the mixed material.

In the mixing process, the dried active electrode powders are mixed with starch, and then concentrated sulfuric acid is added at a solid-liquid ratio of 50-300 g/L and stirred evenly; wherein the amount of starch added is controlled at 5-20 wt. %. Preferably, the amount of starch is controlled at 5-10 wt. %, the solid-liquid ratio is controlled between 100-150 g/L.

Step 4: High Temperature Reduction

Putting the mixed material into a corundum crucible, and then moving the corundum crucible into a tube furnace to calcine with controlling the atmosphere.

In the process of high temperature reduction, controlling the calcination temperature at 300-800° C., heating rate at 10° C./min, and calcination time at 30-180 min; wherein the atmosphere is a mixture of O2 and N2, and the volume fraction of O2 is controlled between 0-50%. Preferably, controlling the calcination temperature at 500-800° C., calcination time at 60-120 min, and the volume fraction of O2 between 10-20%.

Step 5: Water Leaching and Filtration

Taking out the product obtained from calcination in the step 4 and using deionized water to extract the leachate and leaching residue with valence metal ions, and then obtaining the leachate after filtering.

In the deionized water leaching process, the solid-liquid ratio is controlled between 50-100 g/L, the temperature is between 50-90° C., and the leaching time is between 30-180 min. Preferably, in the deionized water leaching process of the step 5, the solid-liquid ratio is controlled between 50-80 g/L, the temperature is between 60-80° C., and the leaching time is between 60-90 min.

The present invention adopts a comprehensive method of high temperature reduction and deposition for the recovery of valuable metals, solving the problems of low product quality, small processing scale, and complex process recovery by using a single deposition method. It avoids the use of expensive extractants for the separate recovery of valuable metals such as Cu, Ni, Co, and significantly reduces the recovery cost.

Example 1

Soaking the waste lithium ion battery mixed with $LiNiO_2$, $LiCoO_2$, $LiMnO_2$, $LiNi_xCo_yMn_{1-x-y}O_2$ in a 5% sodium sulfite solution and discharging it to a termination voltage of 1 V; disassembling the discharged waste lithium ion battery to obtain battery cells; mechanical force is applied to the overall crushing of the battery cells to obtain crushed materials, and the particle size of the crushed materials is sieved out to be less than 0.1 mm for the following calcination; raising the temperature of the crushed materials in an air atmosphere at a rate of 2° C./min to 400° C., heat preservation and calcining for 1 hour, stripping the adhesive, and absorbing the calcining waste gas with 50 mg/L lime water; separating the stripped product to obtain Al foil, Cu foil, and active electrode powders. Alkaline cleaning of the calcined active electrode powders, with the following alkaline cleaning parameters: $NH_4OH$ solution with pH=10, alkaline cleaning time of 10 min, alkaline cleaning temperature of 20° C., filtration, separation, and drying to obtain the purified active electrode powders. Then mixing the dried active electrode powders with starch and concentrated sulfuric acid. The parameters of mixing are as follows: starch mass ratio of 5%, concentrated sulfuric acid solid-liquid ratio of 50 g/L, and obtain the mixed materials after mixing. Next, the mixed materials are sent to the high temperature reduction process. The parameters of the high temperature reduction are as follows: the atmosphere is a mixture of 5% oxygen and 95% nitrogen gas, the calcination temperature is 300° C., and the calcination time is 30 min. Finally, the product of high temperature reduction is leached and filtered with deionized water to obtain the leachate and leaching residue. The deionized water leaching parameters are as follows: solid-liquid ratio is 50 g/L, temperature is 50° C., leaching time is 30 min.

In the leachate, the concentration of impurity ions such as copper, iron, and aluminum ions is all below 0.5 g/L, while the concentration of valuable metal ions such as lithium, nickel, cobalt, and manganese ions is all above 5 g/L. The leaching rate is above 85%.

Example 2

Soaking the waste lithium ion battery in a 10% sodium sulfite solution and discharging it to a termination voltage of 0.8 V; disassembling the discharged waste lithium ion battery to obtain battery cells; mechanical force is applied to the overall crushing of the battery cells to obtain crushed materials, and the particle size of the crushed materials is sieved out to be less than 0.1 mm for the following calcination; raising the temperature of the crushed materials in an air atmosphere at a rate of 5° C./min to 450° C., heat preservation and calcining for 1 hour, stripping the adhesive, and absorbing the calcining waste gas with 50 mg/L lime water; separating the stripped product to obtain Al foil, Cu foil, and active electrode powders. Alkaline cleaning of the calcined active electrode powders, with the following alkaline cleaning parameters: $NH_4OH$ solution with pH=10.5, alkaline cleaning time of 20 min, alkaline cleaning temperature of 25° C., filtration, separation, and drying to obtain the purified active electrode powders. Then mixing the dried active electrode powders with starch and concentrated sulfuric acid. The parameters of mixing are as follows: starch mass ratio of 8%, concentrated sulfuric acid solid-liquid ratio of 100 g/L, and obtain the mixed materials after mixing. Next, the mixed materials are sent to the high temperature reduction process. The parameters of the high temperature reduction are as follows: the atmosphere is a mixture of 10% oxygen and 90% nitrogen gas, the calcination temperature is 500° C., and the calcination time is 60 min. Finally, the product of high temperature reduction is leached and filtered with deionized water to obtain the leachate and leaching residue. The deionized water leaching parameters are as follows: solid-liquid ratio is 75 g/L, temperature is 60° C., leaching time is 60 min.

In the leachate, the concentration of impurity ions such as copper, iron, and aluminum ions is all below 0.4 g/L, while the concentration of valuable metal ions such as lithium, nickel, cobalt, and manganese ions is all above 8 g/L. The leaching rate is above 90%.

Example 3

Soaking the waste lithium ion battery in a 15% sodium sulfite solution and discharging it to a termination voltage of 0.7 V; disassembling the discharged waste lithium ion battery to obtain battery cells; mechanical force is applied to the overall crushing of the battery cells to obtain crushed materials, and the particle size of the crushed materials is sieved out to be less than 0.1 mm for the following calcination; raising the temperature of the crushed materials in an air atmosphere at a rate of 10° C./min to 450° C., heat preservation and calcining for 1 hour, stripping the adhesive, and absorbing the calcining waste gas with 50 mg/L lime water; separating the stripped product to obtain Al foil, Cu foil, and active electrode powders. Alkaline cleaning of the calcined active electrode powders, with the following alkaline cleaning parameters: NH$_4$OH solution with pH=12, alkaline cleaning time of 30 min, alkaline cleaning temperature of 35° C., filtration, separation, and drying to obtain the purified active electrode powders. Then mixing the dried active electrode powders with starch and concentrated sulfuric acid. The parameters of mixing are as follows: starch mass ratio of 10%, concentrated sulfuric acid solid-liquid ratio of 150 g/L, and obtain the mixed materials after mixing. Next, the mixed materials are sent to the high temperature reduction process. The parameters of the high temperature reduction are as follows: the atmosphere is a mixture of 20% oxygen and 80% nitrogen gas, the calcination temperature is 700° C., and the calcination time is 120 min. Finally, the product of high temperature reduction is leached and filtered with deionized water to obtain the leachate and leaching residue. The deionized water leaching parameters are as follows: solid-liquid ratio is 80 g/L, temperature is 80° C., leaching time is 90 min.

In the leachate, the concentration of impurity ions such as copper, iron, and aluminum ions is all below 0.3 g/L, while the concentration of valuable metal ions such as lithium, nickel, cobalt, and manganese ions is all above 10 g/L. The leaching rate is above 93%.

Example 4

Soaking the waste lithium ion battery in a 20% sodium sulfite solution and discharging it to a termination voltage of 0.5 V; disassembling the discharged waste lithium ion battery to obtain battery cells; mechanical force is applied to the overall crushing of the battery cells to obtain crushed materials, and the particle size of the crushed materials is sieved out to be less than 0.1 mm for the following calcination; raising the temperature of the crushed materials in an air atmosphere at a rate of 10° C./min to 600° C., heat preservation and calcining for 1 hour, stripping the adhesive, and absorbing the calcining waste gas with 50 mg/L lime water; separating the stripped product to obtain Al foil, Cu foil, and active electrode powders. Alkaline cleaning of the calcined active electrode powders, with the following alkaline cleaning parameters: NH$_4$OH solution with pH=14, alkaline cleaning time of 60 min, alkaline cleaning temperature of 50° C., filtration, separation, and drying to obtain the purified active electrode powders. Then mixing the dried active electrode powders with starch and concentrated sulfuric acid. The parameters of mixing are as follows: starch mass ratio of 20%, concentrated sulfuric acid solid-liquid ratio of 300 g/L, and obtain the mixed materials after mixing. Next, the mixed materials are sent to the high temperature reduction process. The parameters of the high temperature reduction are as follows: the atmosphere is a mixture of 50% oxygen and 50% nitrogen gas, the calcination temperature is 800° C., and the calcination time is 180 min. Finally, the product of high temperature reduction is leached and filtered with deionized water to obtain the leachate and leaching residue. The deionized water leaching parameters are as follows: solid-liquid ratio is 100 g/L, temperature is 90° C., leaching time is 180 min.

In the leachate, the concentration of impurity ions such as copper, iron, and aluminum ions is all below 0.3 g/L, while the concentration of valuable metal ions such as lithium, nickel, cobalt, and manganese ions is all above 15 g/L. The leaching rate is above 95%.

The above descriptions are only preferred embodiments of the present invention and are not intended to limit the present invention. Any modification, equivalent replacement, improvement, etc., made within the spirit and principle of the present invention shall be included in the protection of the present invention.

What is claimed is:

1. A method for recovering metals from waste lithium ion batteries, including the following steps:
   step 1, pre-treatment, comprising:
   short-circuit discharging, dismantling, crushing, roasting, and screening on waste lithium ion batteries to obtain active electrode powders; wherein the waste lithium ion battery comprises copper and aluminum, and the waste lithium ion battery is one or more of waste lithium nickel oxide lithium ion battery, lithium cobalt oxide lithium ion battery, lithium manganese oxide lithium ion battery, and lithium nickel cobalt manganese oxide lithium ion battery;
   step 2, alkaline cleaning and filtering, comprising:
   using alkaline solution to clean the active electrode powders, then filtering to remove copper and aluminum from the active electrode powders;
   step 3, drying and mixing, comprising:
   drying the active electrode powder after step 2, mixing the dried active electrode powder with starch and concentrated sulfuric acid in a predetermined proportion and stirring to obtain a mixed material,
   wherein the predetermined proportion comprises:
   the dried active electrode powders are mixed with starch, wherein an amount of starch added into the dried active electrode powders is controlled at 5-20 wt. %, and then concentrated sulfuric acid is added at a first solid-liquid ratio of 50-300 g/L and stirred;
   step 4, high temperature reduction, comprising:
   putting the mixed material into a corundum crucible, then moving the corundum crucible into a tube furnace to calcine, and controlling the atmosphere of the tube furnace during calcination,
   wherein controlling the atmosphere of the tube furnace comprises controlling the calcination temperature at 300-800° C., heating rate at 10° C./min, and calcination time at 30-180 min; wherein the atmosphere is a mixture of O$_2$ and N$_2$, and the volume fraction of O$_2$ is greater than 20 and not more than 50; and
   step 5, water leaching and filtration, comprising:
   taking out a product obtained from calcination in the step 4 and using deionized water to extract leachate and leaching residue with valence metal ions, and then obtaining the leachate after filtering.

2. The method for recovering metals from waste lithium ion batteries according to claim 1, wherein in the step 1, the waste lithium ion batteries are short-circuit discharged in a sodium sulfite solution until a termination voltage of the waste lithium ion batteries is below 1 V, wherein a solute concentration of the sodium sulfite solution is 5-20%; disassembling the waste lithium ion batteries after short-circuit discharging to obtain battery cells; crushing the battery cells to obtain crushed materials; raising a temperature of the crushed materials to 400-600° C. at a rate of 2-10° C./min in an air atmosphere, preserving heat and calcining to strip adhesive from the crushed materials; lime water with a concentration of not less than 50 mg/L is used to absorb waste gas released during the adhesive stripping process to obtain calcium fluoride; separating stripped product to obtain Al, Cu, and active electrode powders from the stripped product.

3. The method for recovering metals from waste lithium ion batteries according to claim 1, in the step 2, the alkaline solution is one or more of NaOH, NH₄OH and KOH, with a pH value of 10-14, an alkaline cleaning time of 10-60 min, and a temperature of 20-50° C.

4. The method for recovering metals from waste lithium ion batteries according to claim 3, in the step 2, the pH value of the alkaline solution is 10-12, the alkaline cleaning time is controlled within 10-30 min, and the temperature is controlled between 25-35° C.

5. The method for recovering metals from waste lithium ion batteries according to claim 1, wherein, in the step 3, the amount of starch added into the dried active electrode powders is controlled at 5-10 wt. %, and the first solid-liquid ratio is controlled between 100-150 g/L.

6. The method for recovering metals from waste lithium ion batteries according to claim 1, in the step 4, controlling the calcination temperature at 500-800° C., calcination time at 60-120 min.

7. The method for recovering metals from waste lithium ion batteries according to claim 1, in the deionized water leaching process of the step 5, a second solid-liquid ratio is controlled between 50-100 g/L, the temperature is between 50-90° C., and the leaching time is between 30-180 min.

8. The method for recovering metals from waste lithium ion batteries according to claim 7, in the deionized water leaching process of the step 5, the second solid-liquid ratio is controlled between 50-80 g/L, the temperature is between 60-80° C., and the leaching time is between 60-90 min.

\* \* \* \* \*